(12) United States Patent
Yoo et al.

(10) Patent No.: US 9,124,812 B2
(45) Date of Patent: Sep. 1, 2015

(54) OBJECT IMAGE CAPTURE APPARATUS AND METHOD

(75) Inventors: Jang-Hee Yoo, Daejeon (KR);
Dae-Sung Moon, Daejeon (KR);
Yun-Su Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 349 days.

(21) Appl. No.: 13/311,955

(22) Filed: Dec. 6, 2011

(65) Prior Publication Data

US 2012/0154522 A1 Jun. 21, 2012

(30) Foreign Application Priority Data

Dec. 21, 2010 (KR) .......................... 10-2010-0131557

(51) Int. Cl.
*H04N 5/247* (2006.01)
*H04N 5/232* (2006.01)

(52) U.S. Cl.
CPC ............... *H04N 5/247* (2013.01); *H04N 5/232* (2013.01)

(58) Field of Classification Search
CPC ................... G08B 13/19643; G08B 13/19608; G06T 7/2006
See application file for complete search history.

(56) References Cited

U.S. PATENT DOCUMENTS

| 5,477,272 | A | * | 12/1995 | Zhang et al. | ............. | 375/240.06 |
| 2003/0160863 | A1 | | 8/2003 | Kakou et al. | | |
| 2007/0200933 | A1 | * | 8/2007 | Watanabe et al. | ........ | 348/211.11 |
| 2007/0268369 | A1 | * | 11/2007 | Amano et al. | ........... | 348/207.99 |
| 2009/0180583 | A1 | * | 7/2009 | Park et al. | .......................... | 377/9 |
| 2010/0141767 | A1 | * | 6/2010 | Mohanty et al. | ............. | 348/159 |
| 2011/0228092 | A1 | * | 9/2011 | Park | .............................. | 348/154 |
| 2012/0038776 | A1 | * | 2/2012 | Ahiska et al. | ................. | 348/159 |

FOREIGN PATENT DOCUMENTS

| AU | 2010253639 A1 * | 12/2010 | ............... H04N 7/18 |
| CA | 2755765 A1 * | 12/2010 | ............... H04N 7/18 |
| EP | 1311123 A1 * | 5/2003 | ............... H04N 7/18 |
| JP | 2003-259350 | 9/2003 | |
| KR | 10-1999-0086957 | 12/1999 | |
| KR | 10-2006-0104380 | 10/2006 | |
| KR | 10-2008-0015994 | 2/2008 | |

* cited by examiner

*Primary Examiner* — Sath V Perungavoor
*Assistant Examiner* — Janese Duley
(74) *Attorney, Agent, or Firm* — Staas & Halsey LLP

(57) ABSTRACT

Disclosed herein is an object image capture apparatus. The object image capture apparatus includes a first camera unit, a second camera unit, and a control unit. The first camera unit obtains a wide-area view image by capturing a wide-area view region. The second camera unit obtains a close-up view image by capturing the close-up view region of the wide-area view region. The control unit controls the second camera unit by dividing the wide-area view image into a plurality of blocks, analyzing the resulting blocks, and defining a target block, in which a moving object is detected, as a close-up view region from among the plurality of blocks.

17 Claims, 9 Drawing Sheets

OBJECT IMAGE CAPTURE APPARATUS AND METHOD

CROSS REFERENCE TO RELATED APPLICATION

This application claims the benefit of Korean Patent Application No. 10-2010-0131557, filed on Dec. 21, 2010, which is hereby incorporated by reference in its entirety into this application.

BACKGROUND OF THE INVENTION

1. Technical Field

The present invention relates generally to an object image capture apparatus and method, and, more particularly, to an object image capture apparatus and method which effectively improves the capture of object information in video surveillance, Human Computer Interaction (HCI), Human Robot Interaction (HRI), and smart appliance fields.

2. Description of the Related Art

Technologies for detecting and tracking an object or an interest region using a video image captured by a camera have been applied to various regions, such as a video surveillance system based on a Closed-Circuit Television (CCTV), a user interface based on a gesture, human identification at a distance, an intelligent vehicle, and robot vision processing. Such an application system should essentially obtain detailed image information by effectively searching for a region in which an object or a motion was detected from a long distance away.

First, the simplest moving object tracking method corresponds to a technology for obtaining and analyzing an image in a predetermined region using one or more fixed camera apparatuses, thereby detecting an object. A second moving object tracking method corresponds to a technology for using a camera apparatus which can be controlled by a security and surveillance system in a Pan/Tilt/Zooming (PTZ) manner, with the result that the camera apparatus is manually controlled at a remote place, so that an image is obtained in a desired region and the obtained image is analyzed, thereby detecting a target. However, a method of tracking a moving object using a manual operation from among existing methods reaches the limit because the number of cameras increases in geometric progression. Further, conventional moving object tracking methods are lacking in flexibility in terms of the mutual cooperation between camera apparatuses used to effectively track a moving object. Therefore, conventional moving object tracking methods have problems in that effective performance cannot be provided to systems for controlling a camera and tracking a moving object at high speed, and in that the advantages of the camera systems, which can be controlled in a PTZ manner, cannot be effectively used.

SUMMARY OF THE INVENTION

Accordingly, the present invention has been made keeping in mind the above problems occurring in the prior art, and an object of the present invention is to detect a moving object using a method of dividing a wide-area view image into block units, and systematically calculating or estimating the variation values of the respective blocks, thereby effectively and rapidly detecting the moving object. That is, the object of the present invention is to effectively improve surveillance performance.

Another object of the present invention is to enable a PTZ camera to effectively move at high speed and to be controlled automatically by synchronizing the reference point or a center point of each of the blocks of a wide-area view image with the motion coordinate value of the PTZ camera, and then controlling the motion of the PTZ camera. Therefore, another object of the present invention is to optimize the control range of the PTZ camera.

Another object of the present invention is to rapidly detect a moving object by scanning only a predetermined number of pixels in each of the blocks of a wide-area view image.

In order to accomplish the above object, the present invention provides an object image capture apparatus, including: a first camera unit for obtaining a wide-area view image by capturing a wide-area view region; a second camera unit for obtaining a close-up view image by capturing the close-up view region of the wide-area view region; and a control unit for controlling the second camera unit by dividing the wide-area view image into a plurality of blocks, analyzing the resulting blocks, and defining a target block, in which a moving object is detected, as a close-up view region from among the plurality of blocks.

Here, the first camera unit may be a fixed camera used to capture the wide-area view region at a fixed location; and the second camera unit may be a Pan/Tilt/Zoom (PTZ) camera capable of changing a zoom level and performing panning and tilting operations with respect to the close-up view region.

Here, the first camera unit and the second camera unit may be included in a single PTZ camera; and the control unit, when the PTZ camera zooms out and captures the wide-area view region and the moving object is detected in the target block, may perform control such that the PTZ camera zooms in the target block and captures the close-up view region.

Here, the control unit may include a block division unit for dividing the wide-area view image, obtained by the first camera unit, into the plurality of blocks; an image analysis unit for defining the target block, in which the moving object is detected, as the close-up view region from among the plurality of blocks; and a PTZ camera control unit for controlling the motion of the second camera unit such that the second camera unit may capture the close-up view region.

Here, the image analysis unit may detect the moving object based on at least one of a motion degree, a color distribution, depth information, and feature information in each of the plurality of blocks.

Here, the control unit may perform division such that the sizes of the plurality of blocks are different from each other in consideration of at least one of the Field of View (FOV), resolution and zoom level of the first camera unit and the second camera unit.

Here, the control unit may divide the wide-area view image into the plurality of blocks such that the size of a block of a region which is close to the first camera unit is larger than the size of a block of a region which is far away from the first camera unit.

Here, the control unit may control the motion of the second camera unit by defining a reference point for each of the plurality of blocks, and synchronizing the motion coordinate value of the second camera unit with the reference point.

Here, the control unit may scan a preset number of pixels in a block in order to detect the moving object.

Here, the control unit may define a center point for each of the plurality of blocks, and adjusts the zoom level of the second camera unit such that the second camera unit captures the close-up view region while using the center point as a center point that is used when the second camera unit captures an image.

In order to accomplish the above object, the present invention provides an object image capture method, including: obtaining a wide-area view image by capturing a wide-area view region using a first camera unit; dividing the wide-area view image into a plurality of blocks; detecting a target block in which a moving object is detected from among the plurality of blocks; defining the target block as a close-up view region, and controlling a second camera unit such that the second camera unit captures the close-up view region; and obtaining a close-up view image by capturing the close-up view region using the second camera unit.

Here, the first camera unit may be a fixed camera used to capture the wide-area view region at a fixed location; and the second camera unit may be a PTZ camera capable of changing a zoom level and performing panning and tilting operations with respect to the close-up view region.

Here, the first camera unit and the second camera unit may be included in a single PTZ camera; the obtaining the wide-area view image may include zooming out and capturing the wide-area view region using the PTZ camera; and the obtaining the close-up view image may include zooming in and capturing the close-up view region using the PTZ camera.

Here, the detecting the target block in which the moving object is detected may include detecting the moving object based on at least one of a motion degree, a color distribution, depth information, and feature information in each of the plurality of blocks.

Here, the detecting the target block in which the moving object is detected may include scanning a preset number of pixels in a block in order to detect the moving object.

Here, the dividing the wide-area view image into the plurality of blocks may include performing division such that the sizes of the plurality of blocks are different from each other in consideration of at least one of FOV, resolution and zoom level of the first camera unit and the second camera unit.

Here, the dividing the wide-area view image into the plurality of blocks may include dividing the wide-area view image into the plurality of blocks such that the size of a block of a region which is close to the first camera unit is larger than the size of a block of a region which is far away from the first camera unit.

Here, the object image capture method may further include defining a reference point of each of the plurality of blocks; and wherein the controlling the second camera unit may include controlling motion of the second camera unit by synchronizing the motion coordinate value of the second camera unit with the reference point.

Here, the object image capture method may further include defining the center point of each of the plurality of blocks; and wherein the controlling the second camera unit may include adjusting the zoom level of the second camera unit such that the close-up view region is captured while using the center point as a center point that is used when the second camera unit captures an image.

Here, the object image capture method may further include correcting the zoom level and the motion coordinate value of the second camera unit by analyzing image information about the moving object displayed on the close-up view image in order to obtain an image which has a quality equal to or higher than a preset quality.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
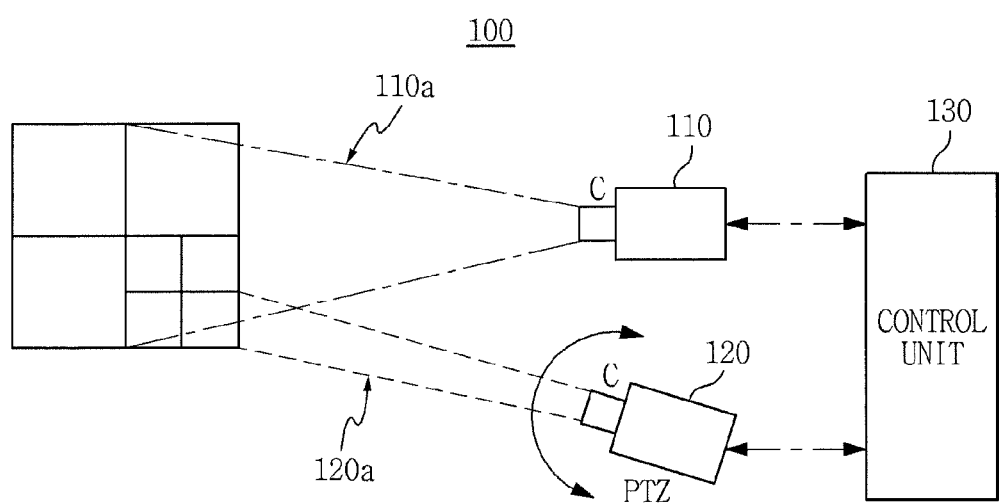
FIG. 1 is a view illustrating the configuration and operation of an object image capture apparatus according to an embodiment of the present invention in brief.

The present invention will be described in detail with reference to the accompanying drawings below. Here, when the description is repetitive and detailed descriptions of well-known functions or configurations would unnecessarily obscure the gist of the present invention, the detailed descriptions will be omitted. The embodiments of the present invention are provided to complete the explanation for those skilled in the art the present invention. Therefore, the shapes and sizes of components in the drawings may be exaggerated to provide a more exact description.

The configuration and operation of an object image capture apparatus according to the embodiment of the present invention will be described below.

Figure 2:
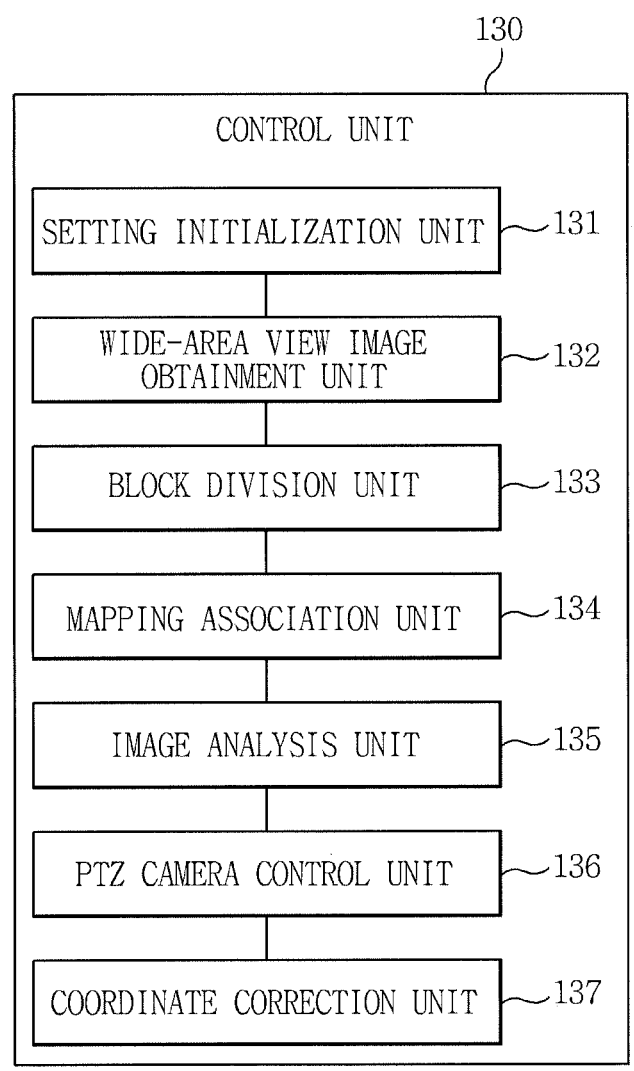
FIG. 2 is a block diagram illustrating the configuration of the control unit of the object image capture apparatus according to the embodiment of the present invention.
Figure 3:
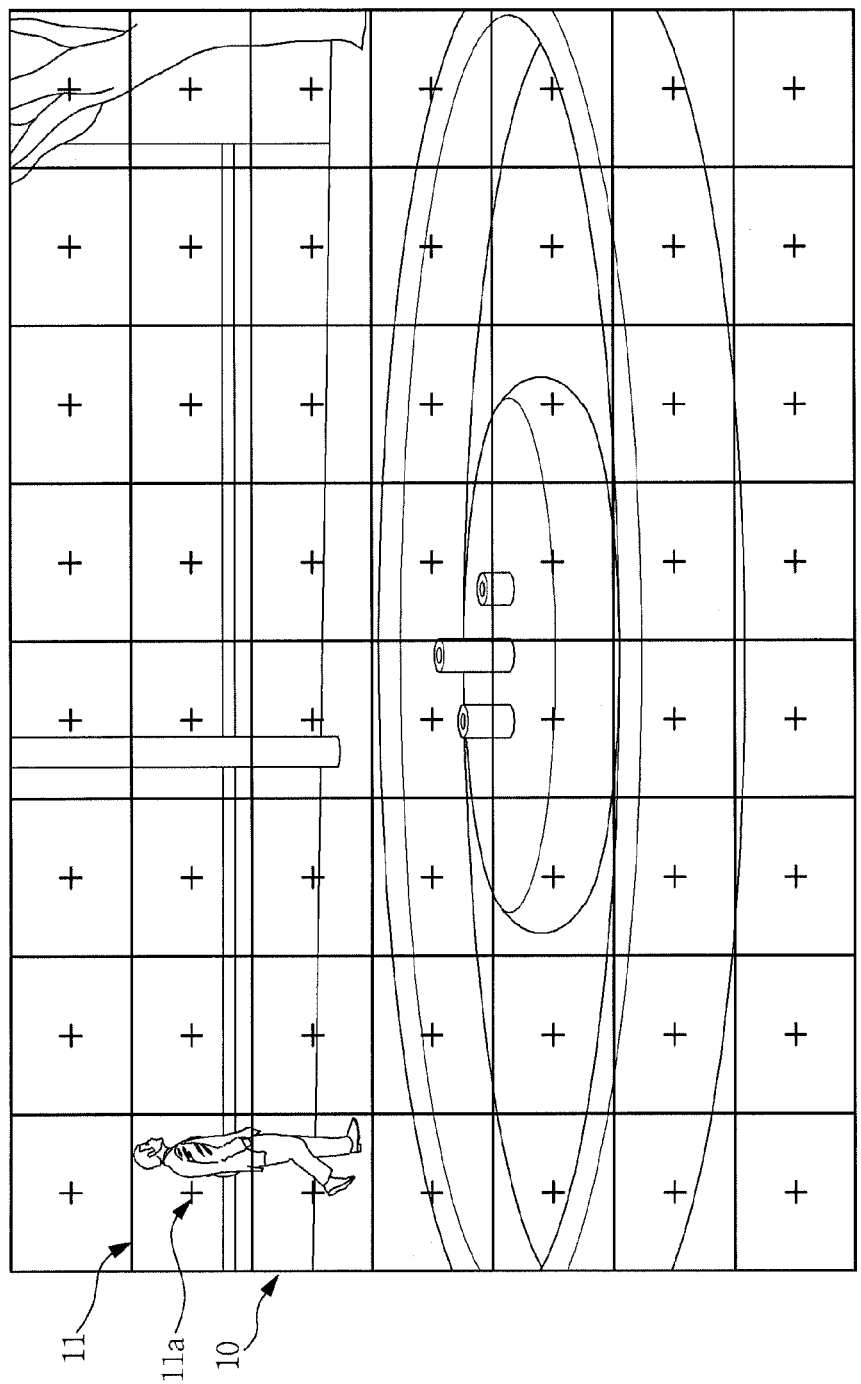
FIG. 3 is a view illustrating an example in which a wide-area view image is divided into a plurality of blocks having the same size.
Figure 4:
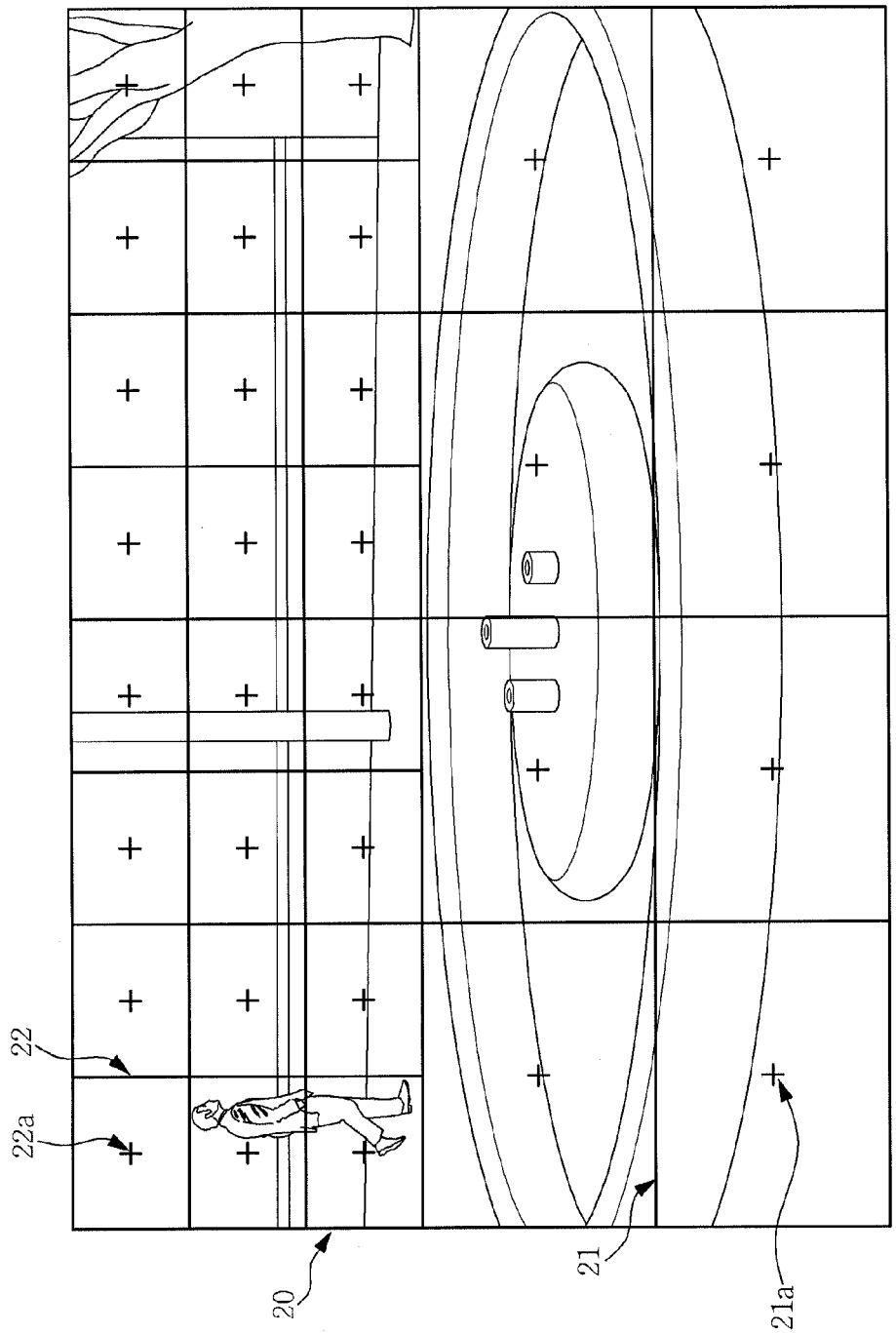
FIG. 4 is a view illustrating an example in which the wide-area view image is divided into a plurality of blocks having different size.
Figure 5:
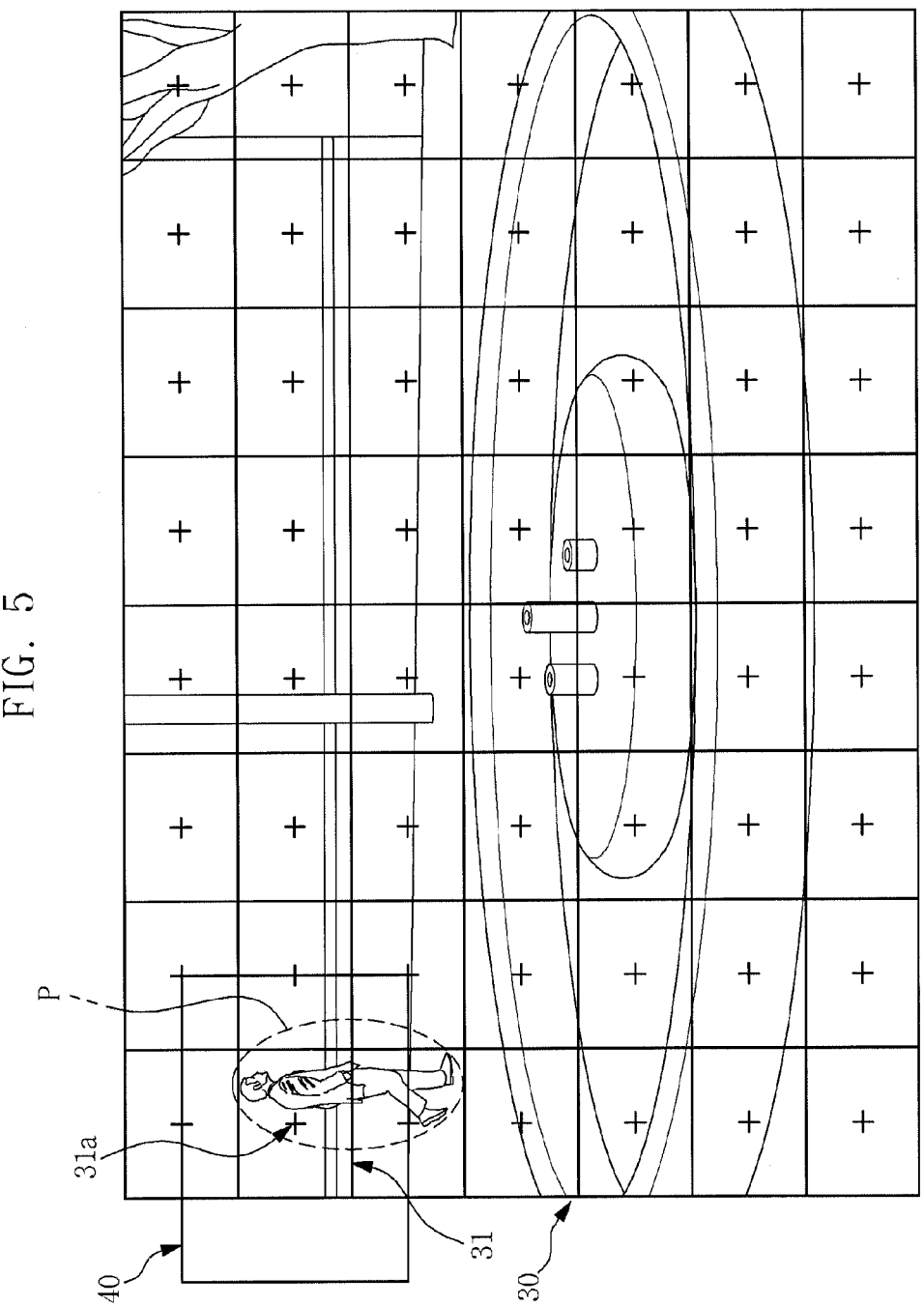
FIG. 5 is a view illustrating an example of the wide-area view image in which a detailed view region is detected.
Figure 6:
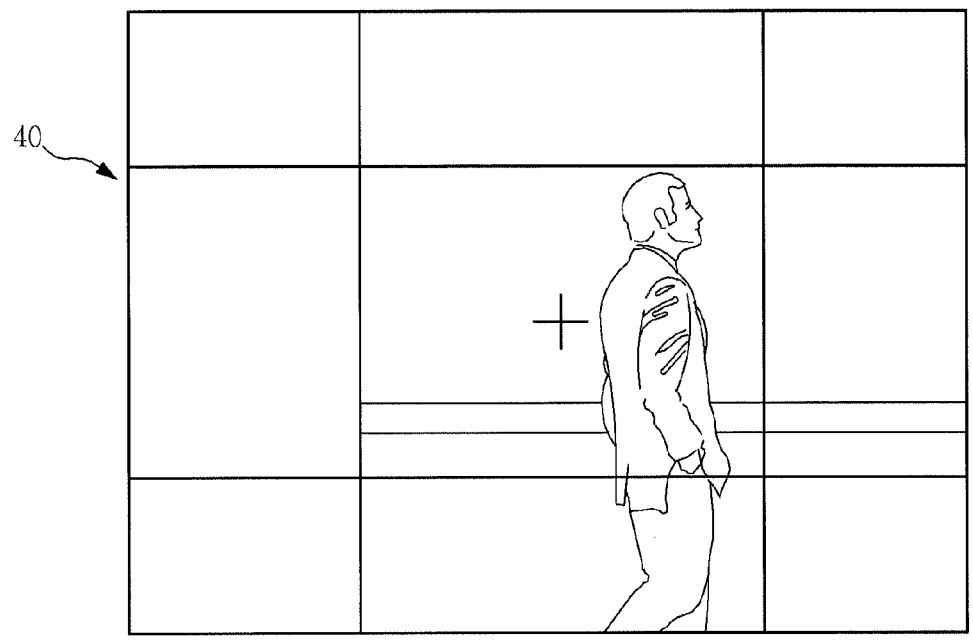
FIG. 6 is a view illustrating an enlarged detail view image with respect to the detailed view region of FIG. 5.

FIG. 1 is a view illustrating the configuration and operation of an object image capture apparatus according to an embodiment of the present invention in brief FIG. 2 is a block diagram illustrating the configuration of the control unit of the object image capture apparatus according to the embodiment of the present invention. FIG. 3 is a view illustrating an example in which a wide-area view image is divided into a plurality of blocks having the same size. FIG. 4 is a view illustrating an example in which the wide-area view image is divided into a plurality of blocks having different size. FIG. 5 is a view illustrating an example of the wide-area view image in which a detailed view region is detected. FIG. 6 is a view illustrating an enlarged detail view image with respect to the detailed view region of FIG. 5.

Referring to FIG. 1, the object image capture apparatus 100 according to the embodiment of the present invention includes a first camera unit 110, a second camera unit 120, and a control unit 130.

The first camera unit 110 captures a wide-area view region 110a and obtains a wide-area view image. The first camera unit 110 may be a fixed camera used to capture the wide-area view region 110a at a fixed location. Here, the first camera unit 110 may be fixed and provided to have a sufficient Field Of View (FOV).

The second camera unit 120 obtains a close-up view image by capturing a close-up view region 120a of the wide-area view region 110a. The second camera unit 120 may be a Pan/Tilt/Zoom (PTZ) camera capable of changing a zoom level and performing panning and tilting operations with respect to the close-up view region 120a.

The control unit 130 controls the image obtaining operation and motion operation of each of the first camera unit 110 and the second camera unit 120. Further, the control unit 130 may be connected to the first camera unit 110 and the second camera unit 120 using an interface such as a Bouncer (BNC), a Local Area Network (LAN), a Universal Serial Bus (USB) or Institute of Electrical and Electronics Engineers (IEEE) 1394.

Referring to FIG. 2, the control unit 130 may include a setting initialization unit 131, a wide-area view image obtainment unit 132, a block division unit 133, a mapping association unit 134, an image analysis unit 135, a PTZ camera control unit 136, and a coordinate correction unit 137.

The setting initialization unit 131 initializes the setting of the first camera unit 110 and the second camera unit 120 in order to start detecting a moving object in a specific region.

The wide-area view image obtainment unit 132 receives the wide-area view image from the first camera unit 110, and stores the wide-area view image.

The block division unit 133 divides the wide-area view image obtained by the first camera unit 110 into a plurality of blocks. Here, the block division unit 133 may perform division such that the sizes of the plurality of blocks are different from each other in consideration of at least one of the FOV, resolution, and zoom level of the first camera unit 110 and the second camera unit 120. In particular, the block division unit 133 may perform division such that the sizes of the plurality of blocks are different from each other in consideration of perspective and a point of view. That is, the block division unit 133 may divide the wide-area view image into the plurality of blocks such that the size of the block of a region which is close to the first camera unit 110 is larger than the size of the block of a region which is located far away from the first camera unit 110. Further, the block division unit 133 may define a reference point or a center point for each of the plurality of blocks.

The mapping association unit 134 associates the central coordinate value of each of the unit blocks obtained from the division performed on the wide-area view image with a real space coordinate value or maps the central coordinate value of each of the unit blocks to a real space coordinate value in order to accurately control the second camera unit 120.

The image analysis unit 135 defines a target block, in which a moving object is detected, from among the plurality of blocks of the wide-area view image as a close-up view region which will be captured by the second camera unit 120. Here, the image analysis unit 135 may detect the moving object from the plurality of blocks based on at least one of a motion degree, a color distribution, depth information, and feature information in each of the blocks. Further, the image analysis unit 135 defines a close-up view region by calculating a variation value in the units of a block. Here, the variation value in the units of a block may be calculated or estimated using various types of methods, such as, background estimation, background subtraction, image intensity variations, statistical hypothesis test, image regression analysis, optical flow analysis, motion estimation, color analysis, and skin color detection. Further, the image analysis unit 135 may scan a predetermined number of pixels in each block in order to detect the moving object. That is, the image analysis unit 135 scans some pixels instead of all the pixels in the corresponding block, thereby rapidly and effectively observing the moving object.

The PTZ camera control unit 136 controls the image-capture motion of the second camera unit 120 such that the second camera unit 120 may capture the close-up view region defined using the image analysis unit 135. Further, the PTZ camera control unit 136 may control the second camera unit 120 by synchronizing the reference point defined by the block division unit 133 with the motion coordinate value of the second camera unit 120. Further, the PTZ camera control unit 136 may adjust the zoom level of the second camera unit 120 such that the center point defined by the block division unit 133 corresponds to a center point that is used when the second camera unit 120 captures the image. That is, the PTZ camera control unit 136 may use a look-up table or storage information, in which a real space has been previously associated or mapped with the reference point/center point coordinate value of a corresponding block, in order to control the high-speed PTZ camera.

The coordinate correction unit 137 analyzes image information about the moving object based on the close-up view image obtained by the second camera unit 120. Further, the coordinate correction unit 137 may correct the zoom level and motion coordinate value of the second camera unit 120 such that the quality of the close-up view image is equal to or higher than the preset quality.

FIG. 3 illustrates an example of a wide-area view image 10 obtained by the first camera unit 110. Further, the wide-area view image 10 is divided into a plurality of blocks 11 having the same size. The control unit 130 detects a moving object on the basis of a block unit. Further, a reference point 11a is set for each of the plurality of blocks 11. The control unit 130 synchronizes the motion coordinate value of the second camera unit 120 with the reference point 11a, thereby controlling the motion of the second camera unit 120.

FIG. 4 illustrates an example of a wide-area view image 20 obtained by the first camera unit 110. Further, the wide-area view image 20 is divided into a plurality of blocks 21 and 22 having different size. The control unit 130 performs division such that the size of the block 21, corresponding to the region which is close to the first camera unit 110, is comparatively large. Further, the control unit 130 performs division such that the size of the block 22, corresponding to the region which is far away from the first camera unit 110, is comparatively small. Further, a reference point 21a or 22a is set for each of the plurality of blocks 21 and 22. The control unit 130 may control the motion of the second camera unit 120 by synchronizing the motion coordinate value of the second camera unit 120 with the reference point 21a or 22a.

FIG. 5 illustrates an example in which a moving object P is detected in the specific target block 31 of a wide-area view region 30. The control unit 130 may control the second camera unit 120 such that the center point of the specific target block 31, in which the moving object P is detected, corresponds to the center point that is used when the second camera unit 120 captures an image. The second camera unit 120 captures a specific target block 31 which includes the moving object P as a close-up view image 40. Further, the close-up view image 40 captured by the second camera unit 120 is shown in FIG. 6.

The configuration and operation of an object image capture apparatus according to another embodiment of the present invention will be described below.

Figure 7:
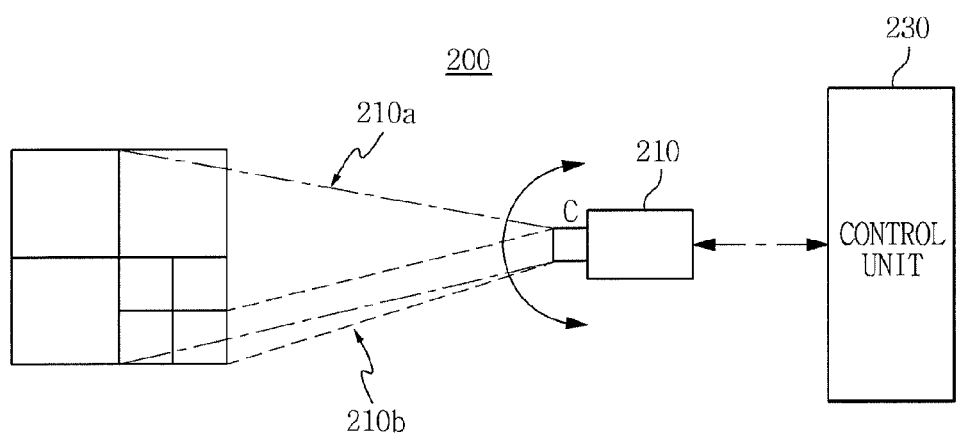
FIG. 7 is a view illustrating the configuration and operation of an object image capture apparatus according to another embodiment of the present invention in brief.
Figure 8:
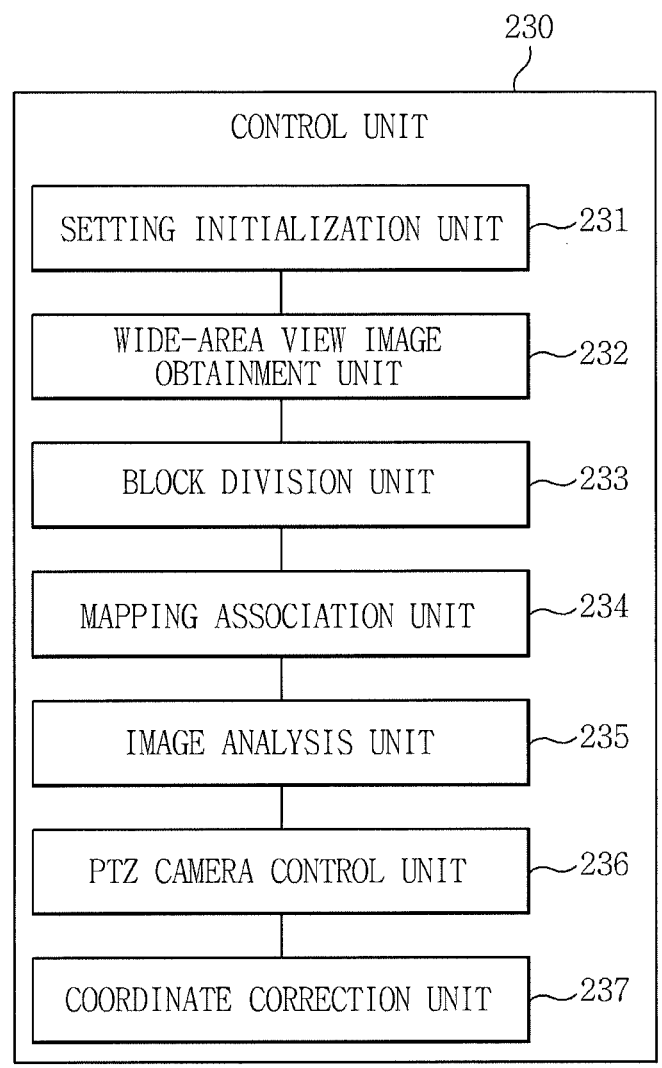
FIG. 8 is a view illustrating the configuration of the control unit of the object image capture apparatus according to another embodiment of the present invention.

FIG. 7 is a view illustrating the configuration and operation of an object image capture apparatus according to another embodiment of the present invention in brief FIG. 8 is a view illustrating the configuration of the control unit of the object image capture apparatus according to another embodiment of the present invention.

Referring to FIG. 7, the object image capture apparatus 200 according to another embodiment of the present invention includes a PTZ camera 210 and a control unit 230. That is, compared to the object image capture apparatus 100 of FIG. 1, which is configured with the first camera unit and the second camera unit using respective cameras, the object image capture apparatus 200 according to another embodiment of the present invention is configured with a single PTZ camera 210 including the first camera unit and the second camera unit.

First, the PTZ camera 210 zooms out, captures a wide-area view region 210a, and obtains a wide-area view image. Here, the PTZ camera 210 may capture the wide-area view region 210a in such a way as to zoom out to generate sufficient FOV. Further, the PTZ camera 210 zooms in, captures a close-up view region 210b, and obtains a close-up view image.

The control unit 230 controls the image obtainment operation and motion operation of the PTZ camera 210. Further, the control unit 230 may be connected to the PTZ camera 210 using an interface, such as the BNC, LAN, USB or IEEE 1394.

Referring to FIG. 8, the control unit 230 may include a setting initialization unit 231, a wide-area view image obtainment unit 232, a block division unit 233, a mapping association unit 234, an image analysis unit 235, a PTZ camera control unit 236, and a coordinate correction unit 237.

The setting initialization unit 231 initializes the setting of the PTZ camera 210 in order to start detecting a moving object in a specific region.

The wide-area view image obtainment unit 232 receives the wide-area view image from the PTZ camera 210, and stores the wide-area view image.

The block division unit 233 divides the wide-area view image obtained by PTZ camera 210 into a plurality of blocks. Here, the block division unit 233 may perform division such that the sizes of the plurality of blocks are different from each other in consideration of at least one of the FOV, resolution, and zoom level of the PTZ camera 210. Further, the block division unit 233 may divide the wide-area view image into the plurality of blocks such that the size of the block of a region which is close to the PTZ camera 210 is larger than the size of the block of a region which is far away from the PTZ camera 210. Further, the block division unit 233 may define a reference point or a center point for each of the plurality of blocks.

The mapping association unit 234 associates the central coordinate value of each of the unit blocks obtained from the division performed on the wide-area view image with a real space coordinate value or maps the central coordinate value of each of the unit blocks to a real space coordinate value in order to accurately control the PTZ camera 210.

Here, image analysis unit 235 defines a target block, in which a moving object is detected, from among the plurality of blocks of the wide-area view image as a close-up view region which will be captured by the PTZ camera 210. Here, the image analysis unit 235 may detect the moving object from the plurality of blocks based on at least one of a motion degree, a color distribution, depth information, and feature information in each of the blocks. Further, the image analysis unit 235 defines a close-up view region by calculating a variation value in the units of a block. Here, the variation value in the units of a block may be calculated or estimated using various types of methods, such as, background estimation, background subtraction, image intensity variations, statistical hypothesis test, image regression analysis, optical flow analysis, motion estimation, color analysis, and skin color detection. Further, the image analysis unit 235 may scan a predetermined number of pixels in each block in order to detect the moving object. That is, the image analysis unit 235 scans some pixels instead of all the pixels in the corresponding block, thereby rapidly and effectively observing the moving object.

The PTZ camera control unit 236 controls the PTZ camera 210 such that the PTZ camera 210 may capture the close-up view region defined by the image analysis unit 235. Further, the PTZ camera control unit 236 may control the PTZ camera 210 by synchronizing the reference point defined by the block division unit 233 with the motion coordinate value of the PTZ camera 210. Further, the PTZ camera control unit 236 may adjust the zoom level of the PTZ camera 210 such that the center point defined by the block division unit 233 corresponds to a center point that is used when the PTZ camera 210 captures the image. That is, the PTZ camera control unit 236 may use a look-up table or storage information, in which a real space has been previously associated or mapped with the reference point/center point coordinate value of a corresponding block, in order to control the high-speed PTZ camera 210.

The coordinate correction unit 237 analyzes image information about the moving object based on the close-up view image obtained using the PTZ camera 210. Further, the coordinate correction unit 237 may correct the zoom level and motion coordinate value of the PTZ camera 210 such that the quality of the close-up view image is equal to or higher than the preset quality.

An object image capture method according to the present invention will be described below.

Figure 9:
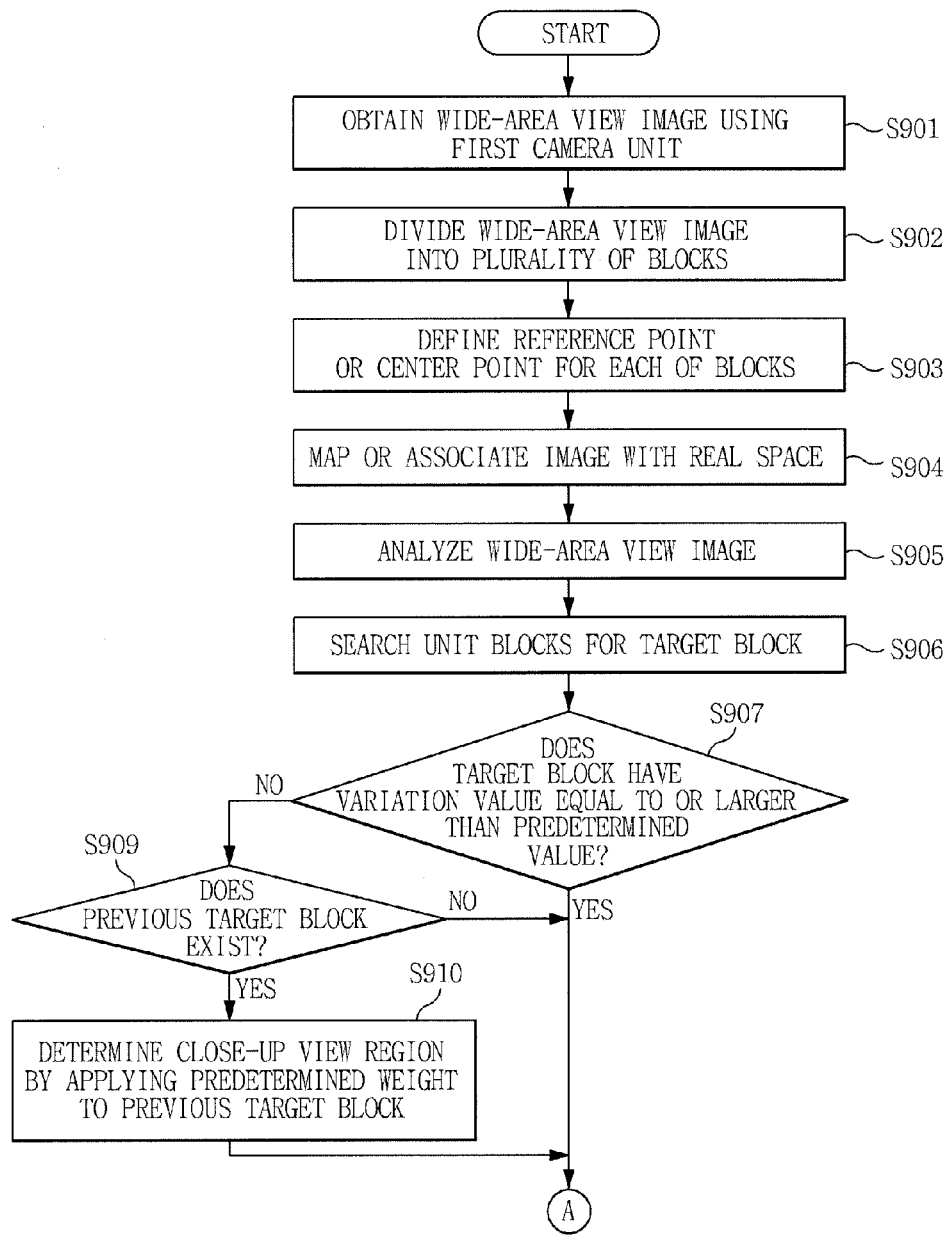
FIGS. 9 and 10 are flowcharts illustrating an object image capture method according to the present invention.
Figure 10:
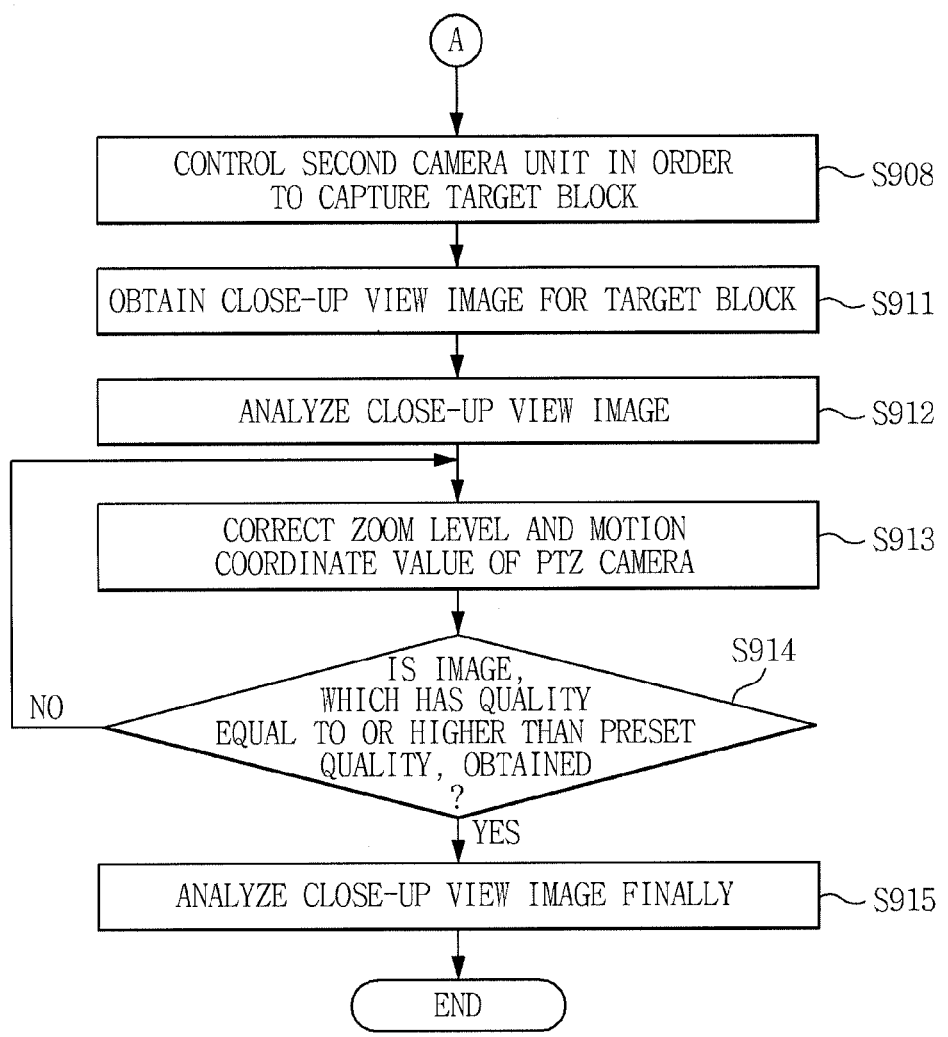

FIGS. 9 and 10 are flowcharts illustrating the object image capture method according to the present invention.

Referring to FIGS. 9 and 10, in the object image capture method according to the present invention, first, a wide-area view image is obtained by capturing a wide-area view region using the first camera unit at step S901.

The wide-area view image, obtained at step S901, is divided into a plurality of blocks at step S902. Here, the division may be performed such that the plurality of blocks have sizes that are different from each other in consideration of at least one of a FOV, a resolution, and a zoom level. Further, the size of the block of a region which is close to the first camera unit may be larger than the size of the block of a region which is relatively far away from the first camera unit.

Further, a reference point or a center point may be defined for each of the plurality of blocks which were obtained through division that was performed at step S902, at step S903.

Further, in order to accurately control the second camera unit, the central coordinate value of each of the divided unit blocks of the wide-area view image is associated or mapped with the coordinate value of a real space at step S904.

Further, the wide-area view image is analyzed, so that it is determined whether a moving object exists in the wide-area view image at step S905.

That is, the unit blocks of the wide-area view image are searched for a target block at step S906. Here, the target block may be a unit block, which has the largest variation value per time, from among the unit blocks. Further, the variation value may be based on at least one of the motion degree, color distribution, depth information and feature information of each of the blocks.

Thereafter, it is determined whether the target block, found at step S906, has a variation value which is equal to or larger than a predetermined value at step S907.

If, as the result of the determination at step S907, the variation value of the target block, found at step S906, is equal to or larger than the predetermined value, the corresponding target block is defined as a close-up view region. Thereafter, the second camera unit, that is, the PTZ camera, is controlled in order to capture the target block at step S908. Here, the motion of the second camera unit may be controlled in such a way that the motion coordinate value of the second camera unit is synchronized with the reference point of the block.

If, as the result of the determination at step S907, the variation value of the target block, found at step S906, is not equal to or larger than the predetermined value, it is determined whether a previous target block, which was defined as the target block before the target block found at step S906 was defined, exists at step S909. If, as the result of the determination at step S909, it is determined that the previous target block does not exist, the target block, found at step S906, is defined as a close-up view region. Further, in order to capture the target block, the second camera unit, that is, the PTZ camera is controlled at step S908.

Meanwhile, if, as the result of the determination at step S909, it is determined that the previous target block exists, a predetermined weight is applied to the variation value of the previous target block, and a final close-up view region is determined by comparing the new variation value to which the weight was applied with the variation value of the target block, found at step S906, at step S910. Thereafter, in order to capture the determined close-up view region, the second camera unit, that is, the PTZ camera is controlled at step S908.

Thereafter, the close-up view image is obtained by capturing the close-up view region using the second camera unit and at step S911.

Thereafter, the close-up view image, obtained at step S911, is analyzed at step S912. That is, image information about the moving object of the close-up view image is analyzed.

Further, the zoom level and motion coordinate value of the PTZ camera are corrected such that the quality of the close-up view image is equal to or higher than a preset quality at step S913.

It is determined whether the quality of the close-up view image is equal to or higher than the preset quality as the result of the correction of step S913 at step S914. If, as the result of the determination at step S914, the quality of the close-up view image is not equal to or higher than the preset quality, the process returns to step S913, and the zoom level and motion coordinate value of the PTZ camera are corrected again.

Meanwhile, if, as the result of the determination at step S914, the quality of the close-up view image is equal to or higher than the preset quality, the close-up view image is used as a final analysis image at step S915. The above-described steps may be continuously and repeatedly performed until an end command is issued.

According to the present invention, a moving object may be effectively and rapidly detected by detecting the moving object using a method of dividing a wide-area view image into block units, and systematically calculating or estimating the variation values of the respective blocks. That is, the present invention may effectively improve surveillance performance.

Further, the present invention enables a PTZ camera to effectively move at high speed and to be automatically controlled by synchronizing the reference point or center point of each of the blocks of a wide-area view image with the motion coordinate value of the PTZ camera, and then controlling the motion of the PTZ camera. Further, the control range of the PTZ camera may be optimized.

Further, the present invention may rapidly detect a moving object by scanning only a predetermined number of pixels of each of the blocks of a wide-area view image.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An object image capture apparatus, comprising:
a first camera unit for obtaining a wide-area view image by capturing a wide-area view region;
a second camera unit for obtaining a close-up view image by capturing a close-up view region of the wide-area view region; and
a control unit for controlling the second camera unit by dividing the wide-area view image into a plurality of blocks, analyzing the resulting blocks, detecting a moving object in a target block, and defining the target block, in which a moving object is detected, as the close-up view region from among the plurality of blocks,
wherein the control unit performs division such that the sizes of the plurality of blocks are different from each other in consideration of at least one of Field of View (FOV), resolution and zoom level of the first camera unit and the second camera unit,
wherein the control unit controls motion of the second camera unit by defining a reference point for each of the plurality of blocks, and synchronizing a motion coordinate value of the second camera unit with the reference point.

2. The object image capture apparatus as set forth in claim 1, wherein:
the first camera unit is a fixed camera used to capture the wide-area view region at a fixed location; and
the second camera unit is a Pan/Tilt/Zoom (PTZ) camera capable of changing a zoom level and performing panning and tilting operations with respect to the close-up view region.

3. The object image capture apparatus as set forth in claim 1, wherein:
the first camera unit and the second camera unit are included in a single PTZ camera; and
the control unit, when the PTZ camera zooms out and captures the wide-area view region and the moving object is detected in the target block, performs control such that the PTZ camera zooms in the target block and captures the close-up view region.

4. The object image capture apparatus as set forth in claim 1, wherein the control unit comprises:
a block division unit for dividing the wide-area view image, obtained by the first camera unit, into the plurality of blocks; and
a PTZ camera control unit for controlling motion of the second camera unit such that the second camera unit captures the close-up view region.

5. The object image capture apparatus as set forth in claim 4, wherein the image analysis unit detects the moving object based on at least one of a motion degree, a color distribution, depth information, and feature information in each of the plurality of blocks.

6. The object image capture apparatus as set forth in claim 1, wherein the control unit divides the wide-area view image into the plurality of blocks such that a size of a block of a region which is close to the first camera unit is larger than a size of a block of a region which is far away from the first camera unit.

7. The object image capture apparatus as set forth in claim 1, wherein the control unit scans a preset number of pixels in a block in order to detect the moving object.

8. The object image capture apparatus as set forth in claim 1, wherein the control unit defines a center point for each of the plurality of blocks, and adjusts a zoom level of the second camera unit such that the second camera unit captures the close-up view region while using the center point as a center point that is used when the second camera unit captures an image.

9. An object image capture method, comprising:
obtaining a wide-area view image by capturing a wide-area view region using a first camera unit;
dividing the wide-area view image into a plurality of blocks;
detecting a target block in which a moving object is detected from among the plurality of blocks;
defining the target block as a close-up view region, and controlling a second camera unit such that the second camera unit captures the close-up view region;
obtaining a close-up view image by capturing the close-up view region using the second camera unit; and
defining a reference point of each of the plurality of blocks,
wherein the dividing the wide-area view image into the plurality of blocks comprises performing division such that the sizes of the plurality of blocks are different from each other in consideration of at least one of FOV, resolution and zoom level of the first camera unit and the second camera unit,
wherein the controlling the second camera unit comprise controlling motion of the second camera unit by synchronizing a motion coordinate value of the second camera unit with the reference point.

10. The object image capture method as set forth in claim 9, wherein:
the first camera unit is a fixed camera used to capture the wide-area view region at a fixed location; and
the second camera unit is a PTZ camera capable of changing a zoom level and performing panning and tilting operations with respect to the close-up view region.

11. The object image capture method as set forth in claim 9, wherein:
the first camera unit and the second camera unit are included in a single PTZ camera;
the obtaining the wide-area view image comprises zooming out and capturing the wide-area view region using the PTZ camera; and
the obtaining the close-up view image comprises zooming in and capturing the close-up view region using the PTZ camera.

12. The object image capture method as set forth in claim 9, wherein the detecting the target block in which the moving object is detected comprises detecting the moving object based on at least one of a motion degree, a color distribution, depth information, and feature information in each of the plurality of blocks.

13. The object image capture method as set forth in claim 9, wherein the detecting the target block in which the moving object is detected comprises scanning a preset number of pixels in a block in order to detect the moving object.

14. The object image capture method as set forth in claim 9, wherein the dividing the wide-area view image into the plurality of blocks comprises dividing the wide-area view image into the plurality of blocks such that a size of a block of a region which is close to the first camera unit is larger than a size of a block of a region which is far away from the first camera unit.

15. The object image capture method as set forth in claim 9, further comprising defining a center point of each of the plurality of blocks; and
wherein the controlling the second camera unit comprises adjusting a zoom level of the second camera unit such that the close-up view region is captured while using the center point as a center point that is used when the second camera unit captures an image.

16. The object image capture method as set forth in claim 9, further comprising correcting a zoom level and a motion coordinate value of the second camera unit by analyzing image information about the moving object displayed on the close-up view image in order to obtain an image which has a quality equal to or higher than a preset quality.

17. The object image capture apparatus as set forth in claim 5, wherein the motion degree comprises an amount of motion.

* * * * *